United States Patent [19]

Hammer et al.

[11] Patent Number: 4,626,189
[45] Date of Patent: Dec. 2, 1986

[54] METHOD AND MACHINE FOR FORMING ARTICLES FROM A PLASTIC MATERIAL

[75] Inventors: Floyd V. Hammer, R.R.1, Union, Iowa 50258; Brian Harper, Havant, United Kingdom

[73] Assignee: Floyd V. Hammer, Union, Iowa

[21] Appl. No.: 798,886

[22] Filed: Nov. 18, 1985

[51] Int. Cl.[4] ............................................. B29B 11/06
[52] U.S. Cl. ..................................... 425/146; 425/147; 425/377; 425/360; 425/576; 425/594; 264/40.5
[58] Field of Search .................. 264/51, 310, 40.5; 425/145–147, 149, 435, 447, 542, 576, 817 R, 360, 540, 559, 560, 588, 594, 377

[56] References Cited

U.S. PATENT DOCUMENTS

| | | | |
|---|---|---|---|
| 2,375,955 | 5/1945 | Smith | 425/377 X |
| 3,500,541 | 3/1970 | Hammerlund et al. | 425/377 X |
| 3,663,139 | 5/1972 | Robbins et al. | 425/147 |
| 4,187,352 | 2/1980 | Klobbie | 521/79 |

Primary Examiner—Charles Hart
Attorney, Agent, or Firm—Zarley, McKee, Thomte, Voorhees & Sease

[57] ABSTRACT

The molding machine of the present invention comprises a screw extruder for extruding plastic material. A plurality of molds are moved one at a time to the outlet end of the extruder for receiving the plastic material therefrom. One end of the mold is open for receiving the plastic material and the opposite end of the mold includes a closure plate covering the end of the mold. The closure plate has a small fill sensing aperture therein. A sensing switch is mounted adjacent the fill sensing aperture and is adapted to sense when molded plastic exits from the fill sensing aperture so as to shut off the extruder and cause the mold to move away from the extruder so that an additional mold can be filled. A cylinder operated closure device clamps the opposite ends of the mold after the mold has moved away from the filling station so as to contain the plastic material within the mold while the plastic material cools and hardens. A trimming knife trims the ends of the mold as it is moving from its fill station to the clamping station.

4 Claims, 6 Drawing Figures

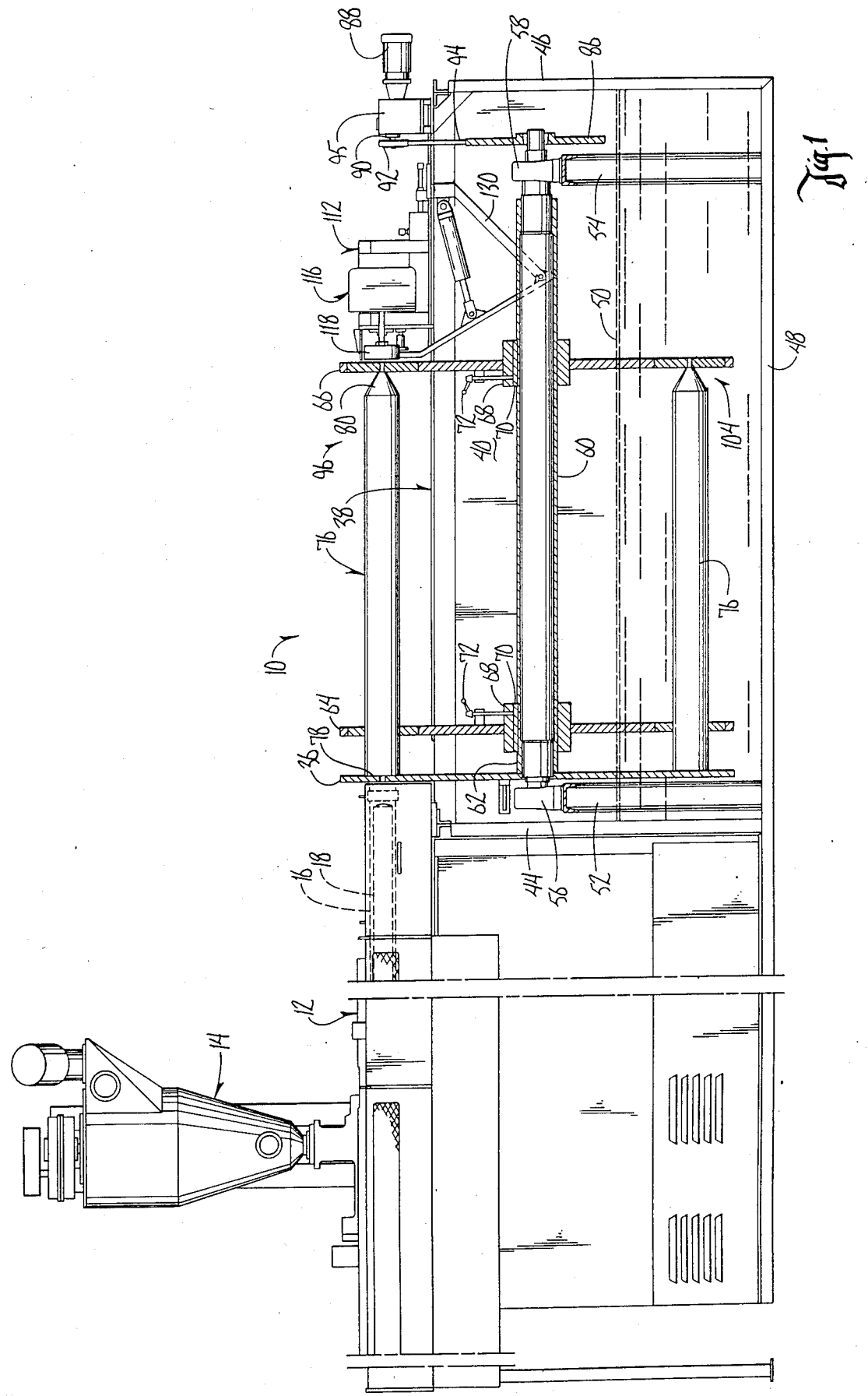

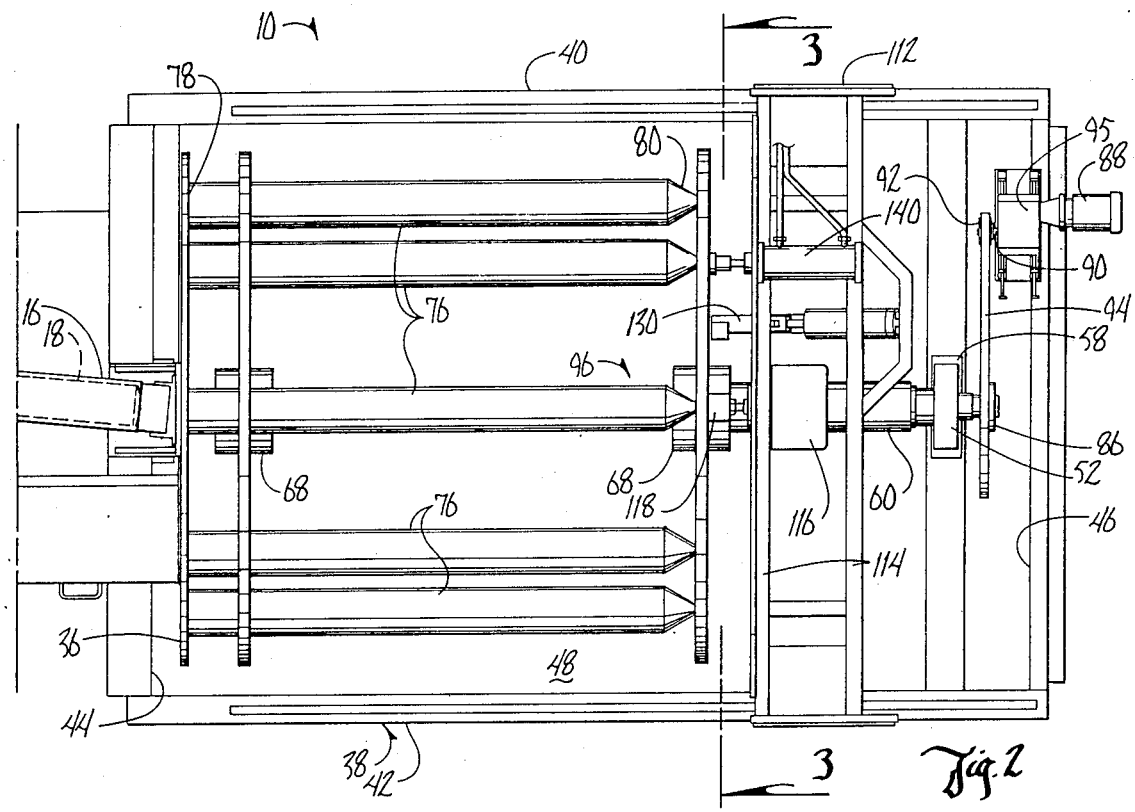
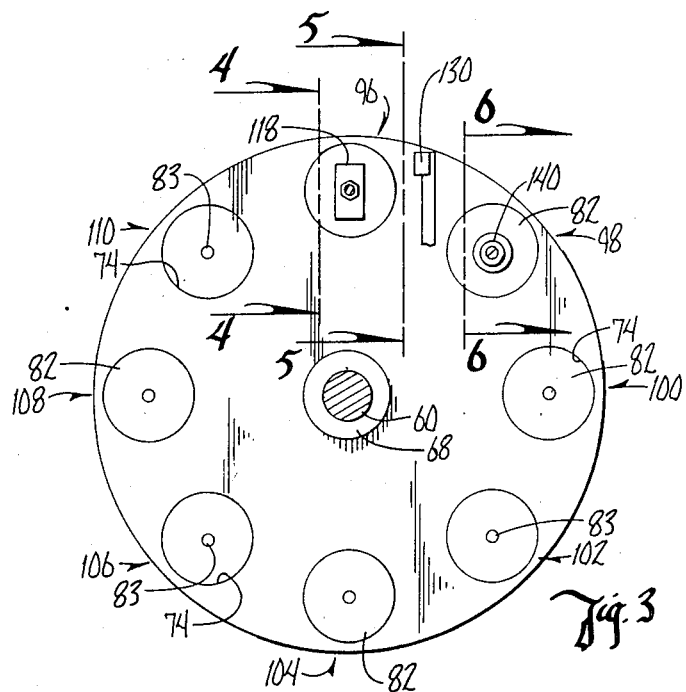

METHOD AND MACHINE FOR FORMING ARTICLES FROM A PLASTIC MATERIAL

BACKGROUND OF THE INVENTION

This invention relates to a method and machine for forming articles from a plastic material. The present invention is particularly adapted for taking waste plastic materials of various heterogeneous make-up, and processing these materials into products which have properties similar to wood.

One example of a prior process for working up waste plastic material is known by the name of the "Reverzer" process, introduced by the Japanese company Mitsubishi Petrochemical, and mentioned in U.S. Pat. No. 4,187,352. According to this process, sorted or unsorted thermoplastic waste material of, for example, polyethylene, polypropylene, polyvinylchloride or mixtures thereof, is comminuted, and the particulate material is subsequently stored in a storage space. The particulate material is dried to a certain extent, using the heat released during the comminution of the waste material. From the storage space, the particulate waste material is supplied to the "Reverzer" unit, which in essence is a melting unit, comprising a hopper in which the material is softened, and a mixer comprising a screw member, in which the material is also fluidized. The fluid material is then injected under very high pressure into a closed mold and thus molded. The molds are then transported to a cooling space, and cooled by being sprayed with water. The molds are then opened and the molded product is removed. The resulting products may have the form of tapered beams, frames, U-beams, etc., depending upon the mold being used. In this prior process, a very high pressure is built up in the mixing and fluidization stage of the apparatus used, under the influence of which, as stated, the fluid material is injected into a special pressure resistant mold.

Klobbie U.S. Pat. No. 4,187,352, discloses a method for working up thermoplastic plastic synthetic material into shaped particles in which specially adapted pressure resistant apparatus is unnecessary, but commercially available non-pressure resistant apparatus and dies or molds can be used.

The Klobbie patent discloses apparatus in which the synthetic material is subjected to a mixing operation in a housing comprising a screw member, and is fluidized, molded, cooled in the mold, and removed from the mold. The synthetic material is supplied to an extruder without a screen pack and without an extrusion nozzle. The mold into which it is extruded is open at both ends so that the fluid is not under pressure within the mold. Molding pressure is obtained by mixing with the particulate synthetic material a blowing agent, the threshhold temperature of which is exceeded at the temperature occurring in the extruder. The blowing agent causes gas to be propogated so as to increase the pressure within the mold, thereby causing the plastic material to assume the shape of the mold.

Therefore, a primary object of the present invention is the provision of an improved machine and method for reprocessing waste polymers to create a molded product under low pressure.

A further object of the present invention is the provision of a machine and process which utilizes low pressure so as to permit the use of an inexpensive mold, but at the same time using a pressure which is higher than that shown in the Klobbie reference referred to above.

A further object of the present invention is the provision of a machine for molding waste polymers which creates a molding pressure within the extruder by use of a nozzle and a screen pack.

A further object of the present invention is the provision of an improved machine for processing waste polymers wherein the polymers can be contaminated with various impurities.

A further object of the present invention is the provision of a machine for processing waste polymers which includes a closure device for closing off the ends of the molds during the molding process.

A further object of the present invention is the provision of a machine for molding waste polymers at a low pressure, but which provides sufficient molding pressure without the need of a blowing agent as shown in the Klobbie patent.

A further object of the present invention is the provision of a machine which includes an automatic fill sensing device which senses when the mold is full and causes it to be indexed away from the extruder.

A further object of the present invention is the provision of a machine for processing waste polymers which utilizes a heating band to cause the waste polymers to achieve a fluid state for extruding.

A further object of the present invention is the provision of an machine which is economical to manufacture, durable in use and efficient in operation.

SUMMARY OF THE INVENTION

The present invention provides a machine for forming products out of waste polymer materials by utilizing a molding pressure substantially greater than that shown in the Klobbie patent referred to above, but substantially less than the high pressure molding referred to in the "Reverzer" process referred to above. As a result, the advantages of molding with a relatively low pressure, i.e., the inexpensive equipment and molds, are achieved with the present invention, while at the same time eliminating the disadvantages encountered with the Klobbie process.

The present invention utilizes an extruder having a screen pack and nozzle head therein. A heater band surrounds the nozzle so as to supply heat to the plastic material before it is extruded. The use of the screen pack and the nozzle create a higher pressure for the plastic material than the pressure obtained in the Klobbie patent. Pressures in the mold need to be sufficiently high to give good quality moldings. For simple moldings, lower pressures give adequate quality, but if the mold has any detail to be shown, then higher pressures are required. Typically the lowest pressure which would produce acceptable moldings would be approximately 30 psi and the highest pressure would be approximately 100 psi. The preferred pressure is dependent upon the nature of the mold.

The plastic materials which may be molded with the present invention include a variety of materials such as low, medium, or high density polyethylene; polypropylene; polystyrene; ABS; polyamide; and polyester. The input materials can be mixed and can have low quality with a large number of impurities therein.

The present invention utilizes a mold holder which holds a plurality of molds and which indexes the molds one at a time, first to a fill station where the molds receive the plastic material from the extruder, and then to a second station wherein the ends of the mold are closed and the molded material is permitted to cool and harden while under pressure. Between the fill station and the second station, a trimming apparatus is provided for trimming any excess material from the ends of the mold prior to the time that the ends of the mold are closed at the second station.

After filling the machine rotates the mold holder to bring an empty mold to the filling station. The mold is filled, and a sensing device at the end of the mold senses when the mold has been filled.

The full mold is taken to a holding station where it is held closed. Closure at the fill orifice is maintained by a pressure piston which presses the fill opening of the mold against a flat metal plate. At the efflux orifice at the other end of the mold, closure is maintained by the pressure piston pressing against the end plate of the mold. This piston is held in place by a pneumatic cylinder which also generates the pressure to give closure at the inlet orifice.

After the mold has been filled, the rosin that has issued from the mold must be trimmed flush with the end face of the mold, thus allowing a good seal by the mold closing device. This operation is performed by a self-positioning cutter located between the fill station and the holding station.

The extruder of the present invention utilizes both a screen pack and an extruder nozzle. The screen pack has the function of removing contamination by impurities which can cause difficulties in the mold filling operation. These difficulties are chiefly due to the release of entrained gases when the pressure is reduced at the nozzle.

The nozzle has two functions. It generates a pressure in the extruder and insures complete mixing of the various components of the input material. It also enables the molds to be filled from a relatively small orifice so as to allow such molds to be of relatively small cross-sectional area when compared with the extruder barrel diameter.

Nozzle heater bands are thermostatically controlled so as to hold the extrudant at a fairly constant temperature and so as to give the desired flow properties.

BRIEF DESCRIPTION OF THE DRAWINGS

FIG. 1 is a side elevational view of the present invention showing portions thereof in section.

FIG. 2 is a top plan view of the righthand portion of the device shown in FIG. 1.

FIG. 3 is a sectional view taken along line 3—3 of FIG. 2.

DETAILED DESCRIPTION OF THE PREFERRED EMBODIMENT

Figure 4:
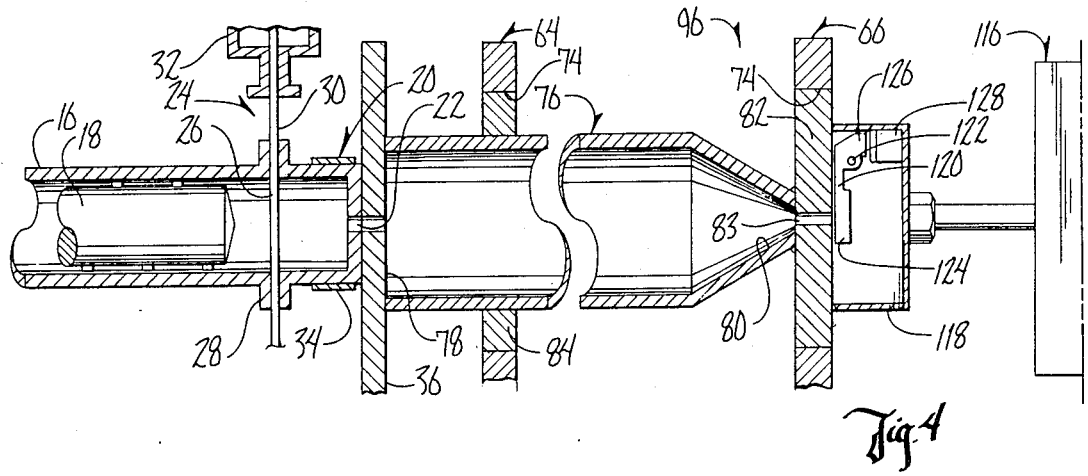
FIG. 4 is a sectional view taken along line 4—4 of FIG. 3.

Referring to the drawings, the numeral 10 generally designates the machine of the present invention. Machine 10 includes a screw extruding machine 12. Any commercially available extruder for processing polyethylene will work satisfactorily with the present invention. Extruding machine 12 includes an input hopper 14 for adding the comminuted plastic waste materials which will be extruded through the machine. Extruder 12 includes an extruding barrel 16 (FIG. 4) having a screw 18 therein for driving the plastic material toward the discharge end of the barrel. At the discharge end of the barrel is a nozzle 20 having an extrusion aperture 22 therein. A screen pack 24 includes a screen plate 26 which is mounted for vertical sliding movement in a slot 28. Attached to screen plate 26 is a rod 30 which in turn is connected to a lifting device 32. Lifting device 32 may be a pneumatic cylinder which permits the upward lifting of the screen pack out of slot 28 for cleaning periodically. Other means may be used for lifting screen 26. The screen pack as shown in the drawings is fitted between the end of the extruder barrel and the nozzle. Other types of screen packs may be utilized than that shown in the drawings, but a self-cleaning type of pack is preferable. In operation, the screen pack has the function of removing contamination or impurities which can cause difficulties in the mold filling operation. These difficulties often arise due to the release of entrained gases when the pressure is reduced at the nozzle.

The nozzle has the function of generating a pressure in the extruder so as to insure complete mixing of the various components of the input material. Furthermore, the nozzle enables the molds to be filled from a relatively small orifice so as to allow the molds to be of a relatively small cross-sectional area when compared with the extruder barrel diameter.

A nozzle heater band 34 surrounds nozzle 20 and is adapted to permit thermostatic control of the temperature of the extruded material, thereby maintaining the material at a constant temperature to obtain the desired flow properties at the nozzle head.

The nozzle is bolted or otherwise operatively secured to a large circular fixed plate 36 which remains stationary with respect to the extruder machine 12. Also attached to the extruding machine 12 is a rectangular tank 38 having side walls 40, 42, end walls 44, 46, and a bottom wall 48. Tank 38 is adapted to hold a water bath or other cooling fluid 50 therein.

Mounted in the bottom of tank 38 are a pair of upstanding pedestals 52, 54 which include bearings 56, 58 at their upper ends for rotatably receiving a tubular shaft 60 therein. Shaft 60 extends rotatably in bearings 56, 58 and also extends rotatably through a sleeve 62 centrally located in circular plate 36.

Mounted on the outside of shaft 60 are a pair of spaced apart carousel plates 64, 66. Each plate 64, 66 includes a cylindrical sleeve 68 having a bushing 70 therein. Threaded within sleeves 68 are tightening rods 72 which are adapted to tighten against bushings 70 so as to clamp plates 64, 66 against sliding movement along shaft 70. The distance between plates 64, 66 may be adjusted by loosening rods 72 and by sliding the plates 64, 66 to the desired relative spaced apart positions.

Each plate 64, 66 includes a plurality of circular openings 74 therein. Mounted within openings 74 and spanning the distance between carousel plates 64, 66 are a plurality of elongated molds 76. Each mold includes a first open end 78 and a second closed end 80. Fitted over end 80 is a closure plate 82 (FIG. 4) having an efflux orifice 84 therein for permitting gases to escape as the mold is being filled. Closure plate 82 is circular and is retentively fitted within the circular opening 74 of carousel plate 66. Open end 78 of mold 76 is fitted against circular plate 36. Welded or otherwise secured to the outer surface of mold 76 is a circular plate 84 which is sized to fit retentively within the opening 74 of carousel plate 64. Thus molds 76 are suspended between carousel plates 64, 66 by means of closure plate 74 and circular plate 84 being fitted within the openings 74 of carousel plates 64, 66. The particular means for holding circular plates 82, 84 in openings 74 may vary, and may include clamps, set screws or other means so as to attach the molds to the carousel plates 64, 66.

Mounted to the end of shaft 60 is a pulley 86. A drive motor 88 includes an output shaft 90 having a pulley 92 thereon. A belt 94 is trained around pulley 92 and pulley 86 so as to provide driving connection between motor 88 and shaft 60, thereby providing means for rotating the shaft 60 and the carousel plates 64, 66. A control box 95 is adapted to control motor 88 so as to cause the carousel plates 64, 66 to be moved in increments one at a time which will cause the various molds to move one at a time from a filling station designated by the numeral 96 in FIG. 3 to a holding or hardening station 98, and thence to periodic other stations 100–110 as shown in FIG. 3.

Mounted for sliding movement on the upper edges of side walls 40, 42 of tank 38 is a sliding frame 112 having a pair of cross frame members 114 spanning the distance between side walls 40, 42. Fixed to cross frame members 114 is a fill sensing assembly 116 which includes a fill sensing box 118 positioned in facing relationship to carousel plate 66 at the fill station 96. Fill sensing box 118 is shown in section in FIG. 4 and includes an elongated arm or blade 120 which is pivoted at 122. On the lower end of arm 120 is a balance weight 124 which fits in facing relationship to aperture 83 in closure plate 82 of mold 76. The upper end of arm 120 is provided with a magnet 126 which is normally in engagement with a magnet reed switch 128. In this normal position, magnetic reed switch 128 controls motor 88 so that there is no rotational movement of the carousel plates when the mold 76 is at the fill station 96.

Upon actuation of the screw extruding machine, plastic material is extruded outwardly through extrusion aperture 22 into mold 76. As the plastic material begins filling the mold 76, it ultimately begins issuing outwardly through fill sensing aperture 83. When this happens, counterbalance 124 is moved to the right as viewed in FIG. 4, thereby causing magnet 126 to break contact with magnetic reed switch 128. When contact is broken between magnet 126 and magnetic reed switch 128, the extruder is stopped and motor 88 causes the carousel plates 64, 66 to be indexed and moved so that the mold 76 progresses from the fill station 96 to the hardening station 98.

Figure 5:
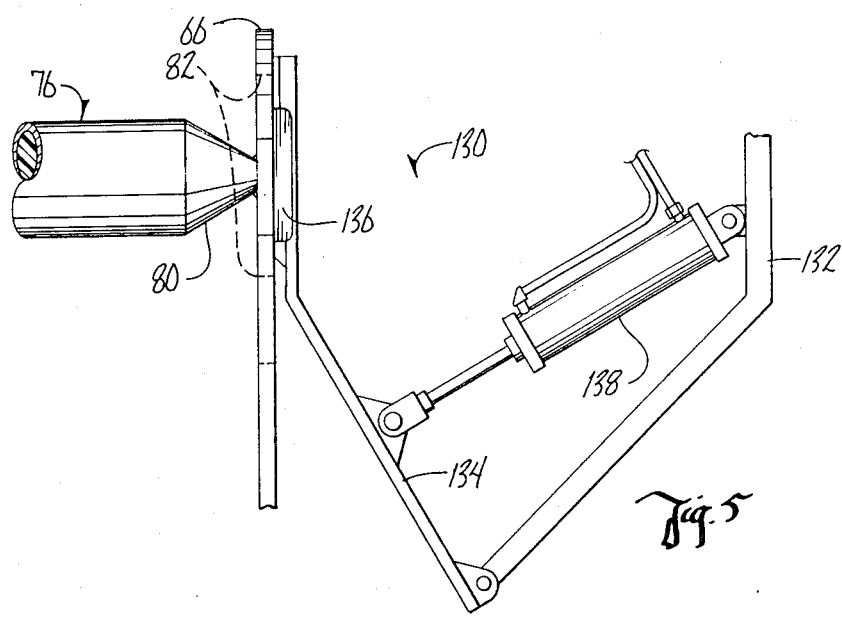
FIG. 5 is a sectional view taken along line 5—5 of FIG. 3.
Figure 6:
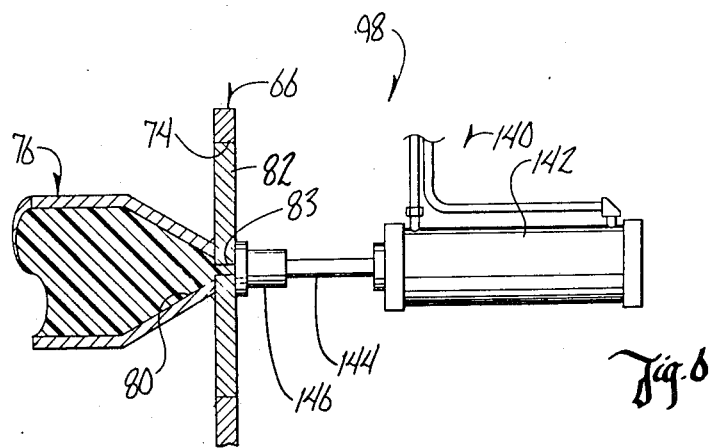
FIG. 6 is a sectional view taken along line 6—6 of FIG. 3.

Positioned between fill station 96 and hardening station 98 is a sprue cutting device 130 shown in FIGS. 2, 3 and 5. Sprue cutting device 130 includes a base frame 132 which is fixed to sliding frame 12 and which extends downwardly therefrom. At the lower end of base frame 132 is pivoted a knife arm 134 having a knife blade 136 thereon. A hydraulic or pneumatic cylinder 138 is connected at one of its ends to base frame 132 and at the other of its ends to knife arm 134. Cylinder 138 maintains knife blade 136 in facing relationship to the outer surface of closure plate 82, and is adapted to trim any resin that has issued from the orifice 83 of the mold. As the mold moves from the fill station 96 to the hardening station 98, the blade 136 wipes along the surface of closure plate 82 and trims the mold flush with the end face.

Mounted at the hardening station 98 is a mold closing device 140. Device 140 includes a cylinder 142 which is rigidly mounted with respect to sliding frame 112. Cylinder 142 includes a rod 144 having at its outer end a circular pad 146 adapted to fit in sealing engagement over fill sensing aperture 83. When the mold 76 reaches the hardening station 98 it stops, and cylinder 142 is extended so that pad 146 fits in sealing engagement over aperture 83. The pad 146 also exerts axial pressure on mold 76 so as to cause the open end 78 of mold 76 to be tightly fitted against the surface of fixed plate 36. Thus, both ends of mold 76 are closed by virtue of the pneumatic cylinder 142 during the time that the mold is at hardening station 98.

At the same time, the mold immediately following mold 76 is now at the fill station and is being filled. With the next indexing of the carousel plates, the second mold comes to the hardening station and the first mold progresses downwardly toward the bath 50 within tank 38. By this time the plastic material has hardened within mold 76 and does not require closure at the opposite ends of the mold 76.

After the molds have been more thoroughly cooled by subjecting them to the cooling bath 50, they can be emptied and used again for the forming of additional products.

The present invention thus permits the molds to be filled at a relatively low pressure, so as to eliminate the need for more expensive molds used in the high pressure molding techniques. However, the present invention permits the molds to be filled under somewhat greater pressure than that achieved with the Klobbie patent discussed above. There is therefore no need for a blowing agent to provide the molding pressure within the mold. The fill sensing device provides an improved method for determining when the mold is full and automatically signaling the machine to index the mold to the next station. The trimming blade and apparatus 130 trims the end of the mold automatically so as to insure a tight seal when the mold is positioned in the hardening station. At the hardening station, the mold is closed at both ends so as to permit the molded material to completely harden with both ends of the mold closed.

Thus, it can be seen that the device accomplishes at least all of its stated objectives.

What is claimed is:

1. A molding machine for forming articles from a plastic material comprising:

a support frame, a screw extruder on said frame and having an inlet and an outlet;

means for introducing into said screw extruder a quantity of plastic material to be extruded, said screw extruder being operable to heat and mix said plastic material and to force said plastic material outwardly through said outlet in a fluid condition;

a plurality of molds, each of said molds having a first open end and a second end, a closure plate being secured in covering relation over said second end so as to substantially close said second end, said closure plate having a fill sensing aperture therein;

a mold holding frame adapted to retentively hold said plurality of molds, mold mounting means movably mounting said mold holding frame to said support frame for movement of each of said molds one at a time to a fill station wherein said first end of said model is in a position to receive said fluid plastic material exiting from said outlet of said screw extruder;

power means for causing movement of said mold mounting means;

fill sensing means mounted on said support frame for covering said fill sensing apertures of said closure plates of said molds when said molds are in said fill position, said fill sensing means being adapted to sense when said fluid plastic material commences issuing from said fill sensing aperture;

switch means connected to said fill sensing means, and said extruder for causing deactuation of said extruder in response to said fill sensing means sensing said fluid plastic material issuing from said fill sensing aperture.

2. A machine according to claim 1 and further comprising said mounting means being movable to move each of said molds one at a time from said fill station to a second station after said molds are filled with said fluid plastic material, a pressure means being located at said second station adjacent said second end of said mold, a pressure plate being mounted on said support frame adjacent said first end of said mold whenever said mold is at said second station, said pressure means being adapted to engage said second end of said mold and force said first end of said mold into sealing engagement with said pressure plate so as to prevent the exit of said fluid plastic from said first and second ends of said mold.

3. A machine according to claim 2 wherein trimming means are positioned between said fill station and said second station for trimming any portions of said fluid plastic material which protrudes from said fill sensing aperture so that said fluid plastic will be trimmed flush with said closure plate prior to the time that said mold reaches said second station.

4. A machine according to claim 3 wherein said trimming means comprises a trimming blade having a cutting portion positioned to frictionally engage said closure plate during movement of said closure plate from said fill station to said second station, trimming power means for exerting a predetermined pressure between said cutting portion and said closure plate.

* * * * *